United States Patent
Yelvington et al.

(10) Patent No.: US 10,550,330 B1
(45) Date of Patent: Feb. 4, 2020

(54) BIOMASS PYROLYSIS REACTOR WITH INTEGRATED QUENCH AND METHOD FOR CONVERTING BIOMASS TO LIQUID BIO-OIL

(71) Applicant: Mainstream Engineering Corporation, Rockledge, FL (US)

(72) Inventors: Paul E. Yelvington, Rockledge, FL (US); Dustin J. Zastrow, Wausau, WI (US); Nicholas R. Schwartz, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

(21) Appl. No.: 15/791,916

(22) Filed: Oct. 24, 2017

Related U.S. Application Data

(62) Division of application No. 14/488,337, filed on Sep. 17, 2014, now Pat. No. 10,017,700.

(51) Int. Cl.
*C10G 1/08* (2006.01)
*B01J 8/24* (2006.01)

(52) U.S. Cl.
CPC . *C10G 1/08* (2013.01); *B01J 8/24* (2013.01)

(58) Field of Classification Search
CPC ................. C10G 1/08; C10L 1/02; B01J 8/24
See application file for complete search history.

(56) References Cited

U.S. PATENT DOCUMENTS

| | | | |
|---|---|---|---|
| 2,016,798 A | 10/1935 | Cooke | |
| 3,935,288 A | 1/1976 | Riegel | |
| 3,959,420 A | 5/1976 | Geddes et al. | |
| 4,248,834 A | 2/1981 | Tokumitsu | |
| 4,279,734 A | 7/1981 | Gwyn | |
| 5,059,404 A | 10/1991 | Mansour et al. | |
| 5,219,530 A | 6/1993 | Hertzberg et al. | |
| 5,270,016 A | 12/1993 | Alagy et al. | |
| 5,853,548 A | 12/1998 | Piskorz et al. | |
| 5,961,786 A | 10/1999 | Freel et al. | |
| 6,844,420 B1 | 1/2005 | Freel et al. | |
| 7,004,999 B2 | 2/2006 | Johnson et al. | |
| 7,905,990 B2 | 3/2011 | Freel | |
| 8,057,641 B2 | 11/2011 | Bartek et al. | |

(Continued)

FOREIGN PATENT DOCUMENTS

CA 1241541 A1 9/1988

OTHER PUBLICATIONS

Boroson et al., AIChE Journal, vol. 35, No. 1, pp. 120-128, 1989.

*Primary Examiner* — Latosha Hines
(74) *Attorney, Agent, or Firm* — Michael W. O'Neill, Esq.

(57) ABSTRACT

An apparatus and method are described for high-yield fast pyrolysis of biomass feedstock to produce a liquid bio-oil product. A bubbling fluidized bed reactor is provided having an integrated, rapid quench apparatus for minimizing secondary cracking reactions that can otherwise lower the yield of bio-oil. A quench stream is provided inside the reactor to minimize the residence time that the product vapors spend at high temperature where cracking can occur. The quench stream is introduced downstream of the fluidized bed but still internal to the reactor. The fluidized bed medium is constrained to the bottom of the reactor and is not cooled by the quench stream.

3 Claims, 1 Drawing Sheet

(56) References Cited

U.S. PATENT DOCUMENTS

2011/0139596 A1* 6/2011 Bartek .................... C10B 49/22
  201/2.5
2011/0219680 A1   9/2011 Wilkomirsky Fuica
2011/0258914 A1* 10/2011 Banasiak ................ C10B 49/10
  44/307

* cited by examiner

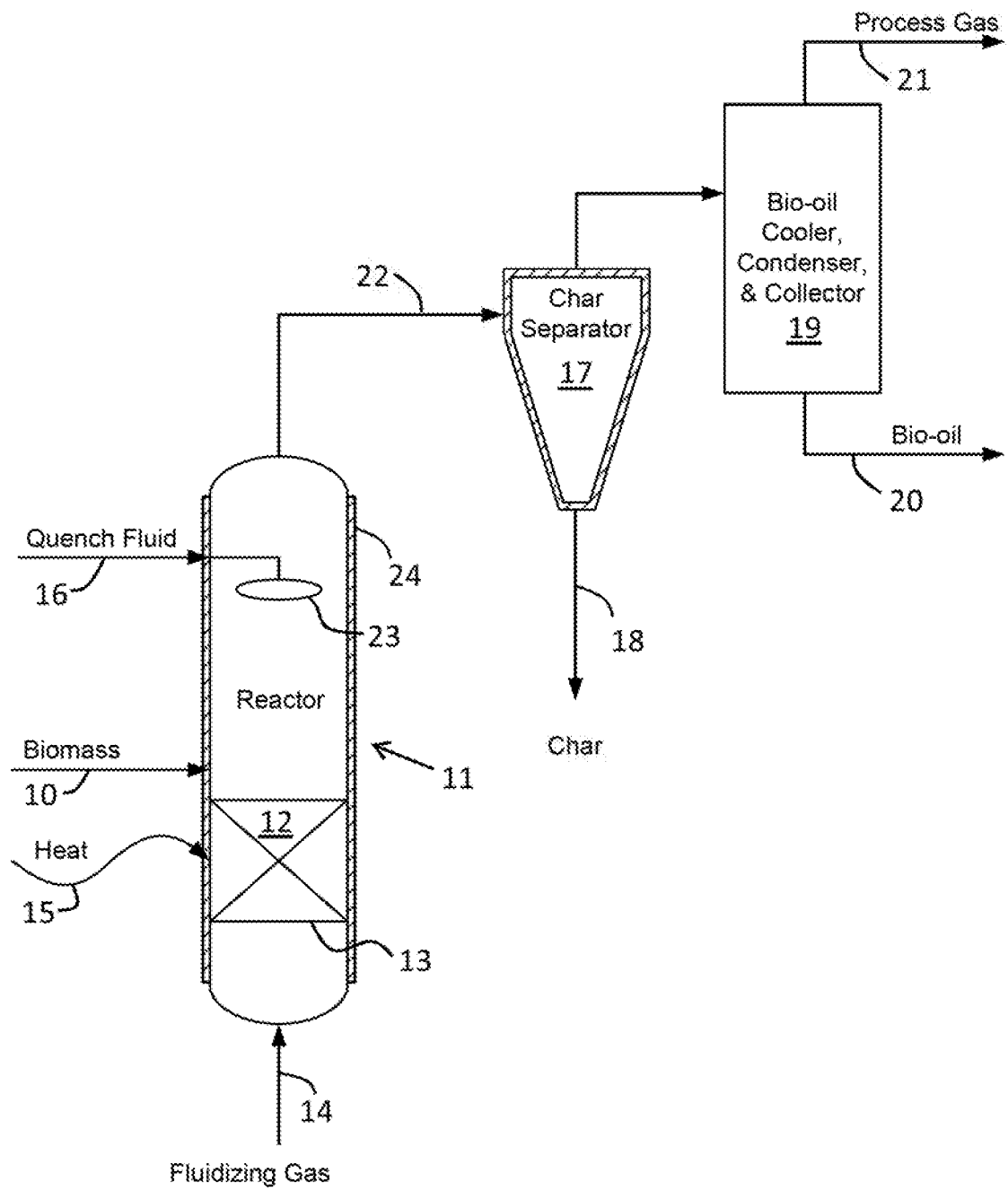

BIOMASS PYROLYSIS REACTOR WITH INTEGRATED QUENCH AND METHOD FOR CONVERTING BIOMASS TO LIQUID BIO-OIL

STATEMENT REGARDING FEDERALLY SPONSORED RESEARCH OR DEVELOPMENT

This invention was made with Government support under contract FA9302-09-C-0021 awarded by the U.S. Air Force. The Government has certain rights in the invention.

BACKGROUND AND SUMMARY OF THE INVENTION

The present invention is concerned with biomass pyrolysis, also referred to as thermolysis. Particularly, the present invention is concerned with an apparatus for converting biomass to pyrolysis bio-oil with high yield and minimal byproducts.

Solid biomass, typically wood, energy crops, and agricultural residues, can be converted to useful products, such as fuels or chemicals, by the application of heat. The most common example of thermal conversion is combustion, where air is added and the entire biomass feed material is burned to provide hot combustion gases for the production of heat, steam, and/or work. A second example is gasification, where the biomass feedstock is reacted at high temperature (typically >700° C.) without combustion with a controlled amount of oxygen and/or steam to produce a combustible fuel gas. The combustible gas, known as producer gas or synthesis gas (syngas), is comprised of carbon monoxide, hydrogen, and carbon dioxide. A final example of thermal conversion is pyrolysis where the solid biomass is converted to liquid and char, along with a gaseous byproduct, through reaction at high temperatures (typically 350-550° C.) in a substantially oxygen-free environment.

In a generic sense, pyrolysis is the conversion of biomass to a liquid and/or char by the action of heat in a substantially non-oxidizing environment. The char is a carbonaceous solid (including traces of inorganic ash) that remains after the majority of the organic material has been removed from the biomass through pyrolysis. A small quantity of combustible gas is also a typical byproduct. Historically, pyrolysis was a relatively slow process where the resulting liquid product was a viscous tar. Conventional slow pyrolysis has typically taken place at temperatures below 400° C. and at reactor residence times ranging from several seconds to minutes. The residence time can be measured in hours for some slow pyrolysis processes used for charcoal production.

A more modern form of pyrolysis, termed fast (or flash) pyrolysis, was discovered in the late 1970s when researchers noted that a high yield of a light pourable liquid was possible from biomass. In fact, liquid yields approaching 75% of the weight of the input woody biomass material were possible if the pyrolysis temperatures were moderately raised (compared to slow pyrolysis) and the conversion was allowed to take place over a very short time period, typically less than 5 seconds.

The homogeneous liquid product from fast pyrolysis, which is generally opaque dark brown in color, has since become known as bio-oil (or pyrolysis oil). Bio-oil is mixture of various oxygenated hydrocarbons and water derived from depolymerization of the lignocellulosic biomass material. Bio-oil is suitable as a fuel for combustion in boilers and for use in modified diesel engines and stationary turbines. This liquid product is in stark contrast to slow pyrolysis, which produces a thick, low quality, two-phase tar-aqueous mixture in very low yields.

In practice, the fast pyrolysis of solid biomass causes the major part of its solid organic material to be rapidly transformed into a vapor phase. This vapor phase contains both non-condensable gases (including methane, hydrogen, carbon monoxide, carbon dioxide and other light hydrocarbons) and condensable organic vapors. The condensable vapors are cooled and collected as the final liquid bio-oil product. The yield and value of this bio-oil product is a strong function of the method and efficiency of the downstream capture and recovery system. The condensable vapors produced during fast pyrolysis continue to react in the vapor phase, and therefore must be quickly cooled or "quenched" in the downstream process before they can deteriorate into lower value tarry solids or non-condensable gaseous products. Of particular concern is the secondary cracking of the product vapors into smaller molecules that cannot be condensed and incorporated into the desired liquid bio-oil product.

There are two main types of biomass pyrolysis reactors in service today as commercial-scale or pilot-scale plants-bubbling fluidized beds and circulated (or transported) fluidized beds. In both types of reactors, a fluidized bed is used to transfer heat quickly to the biomass feedstock particles. The fluidized bed is a solid/gas mixture that behaves as a fluid due to the introduction of gas flow through the particulate bed medium. A refractory, inorganic material such as sand is often used for this the bed medium. Optionally, the bed medium can contain a catalyst that promotes the formation of more desirable product compounds. The biomass is fed into the reactor where it contacts the bed and the heat is conducted into the biomass particle which begins to pyrolyze, and the organic vapors then are transported out of the biomass particle. The bed is supported underneath by a porous flow distributor that ensures even fluidization. As the biomass particles react, they lose mass as vapors are produced. The outside of the particles are also abraded by the bed medium, exposing fresh biomass material, and leading to progressively smaller particles. In the bubbling fluidized bed reactor, the fluidization velocity is low enough that the bed medium is not carried out of the top of the reactor by the upward flow of the fluidizing gas. The vapors and small char particles are elutriated from the bed and carried out of the top of the reactor. No additional separator (disengager) is required separate the bed medium from the products. In contrast, in a circulating fluidized bed reactor, the vapors, char, and bed medium are all carried out of the top of the reactor. Typically the char and bed medium are then separated from the vapors using a separator (or disengager) such as a cyclone separator or the like. The bed medium is then reheated, often by combustion of the char and excess process gas, and returned to the reactor. The bubbling fluidized bed reactor has an advantage over the circulating fluidized bed in that the bed material is separated from the pyrolysis vapors at an earlier stage in the process, inside the reactor vessel rather than later in a separator after leaving the reactor. This early separation provides the opportunity to quench the pyrolysis vapors more quickly and effectively. Another advantage of the bubbling fluidized bed reactor is that the lower portion of the reactor is dense with bed medium (e.g. sand) rather than having the bed medium dispersed throughout the whole reactor. The dense bed provides better heat transfer to the biomass and abrasion of the biomass and thereby improves the reaction rate and enables the short vapor residence time characteristic of fast pyrolysis.

Boroson et al. (*AIChE Journal*, Vol. 35, No. 1, pp. 120-128, 1989) measured the rate of secondary cracking reactions for primary wood bio-oil and found the bio-oil yield decreased by roughly 5% after only 2 s of exposure at 500° C. Other researchers have measured similar rates, although generally they have been faster indicating the potential for even greater loss of yield with inadequate quenching. Regardless, it has been clearly demonstrated that limiting the exposure of the pyrolysis vapors to high temperatures is crucial to maintaining a high liquid yield. That said, until the char particles have been removed, the temperature must be maintained above the dew point of the bio-oil (i.e., the temperature that corresponds to the condensation of the first drop of liquid). Otherwise, the liquid product will foul the internal surfaces of the reactor, piping and cyclone separator. In prior biomass pyrolysis reactors (both bubbling fluidized beds and circulating fluidized beds), the quenching was done external to the reactor and downstream of the cyclone. In these reactors, the quenching has been done either indirectly, through a heat exchanger, or directly by spraying the hot vapors with bio-oil that was previously condensed and cooled. As used herein, the term "indirect", as applied to heat exchange methods, implies that the medium to which heat is principally transferred does not contact the higher temperature material, heat transfer being accomplished via conduction through an intermediate medium such as a tube wall or other barrier. Similar quenching arrangements external to the reactor have been used for condensing the reactive pyrolysis vapors produced during the steam cracking (pyrolysis) of light alkanes to make ethylene in the chemical industry.

U.S. Pat. No. 8,057,641 describes quenching inside the reactor in a circulating fluidized bed reactor for biomass pyrolysis. The quench, as described, necessarily cools the pyrolysis vapors and also the bed medium (i.e., heat carrier), which is later removed in a separator (disengager) downstream of the reactor. Cooling the bed medium is undesirable because it must then be reheated, requiring more heat than otherwise necessary and reducing the overall thermal efficiency of the process. There is a need for improved biomass pyrolysis reactors that provide a rapid quench to minimize yield-robbing secondary cracking reactions while maintaining good thermal efficiency of the process.

An object of our invention is to maximize the liquid yield of bio-oil in the fast pyrolysis of biomass or carbonaceous material with an improved apparatus and method for quenching the product vapors to avoid secondary cracking reactions.

Another object of our invention is to recycle process gas to the bubbling fluidized bed reactor as the quench fluid.

Unlike the known variations of fast pyrolysis reactors, the present invention improves on them by introducing the quench fluid inside the reactor in a bubbling fluidized bed reactor. The quench fluid is introduced above and downstream of the bed thereby only cooling the vapors and not the bed medium. In addition to reducing the cooling requirements for quenching, the rate of quenching is increased because of the lower thermal capacity of the quenched stream. This reactor configuration avoids the energy-wasting task of reheating the bed medium. The bed medium is much denser than the vapors, therefore cooling only the vapors dramatically reduces the thermal capacity of the stream being cooled, allowing the quenching to occur significantly faster. The temperature is rapidly decreased by the introduction of the quench fluid by rapid and efficient direct heat transfer. The temperature is maintained above the dew point of the bio-oil but below the temperature where significant secondary cracking occurs, until the vapors leave the reactor and pass through the char separator that removes the char from the product vapor. The vapor is then further cooled in a second stage where the bio-oil is condensed and collected. Maintaining the temperature above the dew point of the bio-oil upstream of the condenser eliminates fouling of the internal surfaces of the reactor, char separator, and piping due to the condensation of the heavy fraction of the bio-oil. Char is known to catalyze the secondary cracking of bio-oil to non-condensable gases. Therefore the char is separated from the reactor as soon as possible to minimize these reactions.

BRIEF DESCRIPTION OF THE DRAWING

Other objects, advantages and novel features of the present invention will become apparent from the following detailed description when considered in conjunction with the accompanying sole FIGURE which is a schematic illustration of the improved fast pyrolysis reactor according to our invention along with a general description of the conventional balance-of-plant components.

DETAILED DESCRIPTION OF THE DRAWING

Now referring to the sole FIGURE, biomass 10 is fed to the reactor 11 in or above the bubbling fluidized bed 12. When the biomass is fed above the fluidizing bed, as shown, it falls into the fluidized bed 12 due to gravity and is incorporated into the bed through the bubbling action of the bed. Examples of suitable biomass include forestry waste such as wood chips, branches, and sawdust; agricultural residues such as rice straw, corn stover, and sugarcane bagasse; organic solid waste such as paper, cardboard, yard waste, and certain plastics; energy crops such as switchgrass, eucalyptus, and algae; and the like. Preferably the biomass is milled to a particle size in the range 1-3 mm in diameter before entering the reactor. The bed 12 contains an inorganic refractory material such as sand or a catalytic material. The bed is supported from underneath by a flow distributor 13 such as a porous sintered metal disk. Substantially oxygen-free fluidizing gas 14 is provided from below the reactor 11 at a linear velocity above the minimum fluidization velocity for the bed. "Substantially oxygen-free" means having an oxygen concentration less than 1% by volume. Heat 15 is applied to the reactor to maintain the bed temperature between 350° C. and 600° C. The heat 15 is added to the fluidized bed 12 indirectly through a heat exchanger in the bed or through the reactor walls. The fluidized bed 12 has a high heat-transfer coefficient and provides a self-cleaning heat transfer surface on the walls of the reactor or heat exchanger. The heated sand then heats the biomass particles. Additional reactor heat can optionally be introduced by providing the oxygen-free fluidizing gas 14 at an elevated temperature.

The lignocellulosic material in the biomass particles depolymerizes and vaporizes upon introduction to the hot fluidized bed. The product vapors are carried up and out of the reactor through the exit. The solid char particles that remain after the volatile material has been removed are now smaller and lighter than the fresh biomass feed particles. As a result, the char is elutriated from the reactor by the upward flow of fluidizing gas 14. Quench fluid 16 is introduced at a point above the bubbling fluidized bed. This arrangement has the advantage that only the product vapors and char are quenched and not the bed medium (i.e., sand or catalyst) which is unnecessary and detrimental to the thermal efficiency of the process. The thermal capacity of the bed medium would also slow the quenching process. The quench fluid could be either a gas or liquid. Preferably the quench fluid 16 is comprised of recycled non-condensable process gas 21. Other examples of potential quench gases include steam, nitrogen, carbon monoxide, carbon dioxide, light hydrocarbons, and the like. Alternatively, the quench could be provided by vaporizing a liquid such as water, a hydrocarbon, bio-oil, a light bio-oil fraction, or the like. Vaporizing a liquid quench fluid would provide latent cooling in addition to sensible cooling. The residence time for the vapor in the reactor is short, on the order of several seconds or less. The specific residence time is an engineering trade-off decision between bio-oil yield and process throughput subject to constraints on superficial velocity of the fluidizing gas needed to provide good fluidized bed behavior. That residence time is controlled by the flow rate of fluidizing gas and the location of the quench stream inlet. The quench fluid 16 effectively freezes the composition of the product vapors and therefore the residence time in the reactor downstream of the quench fluid introduction does not appreciably contribute to the cracking process. The quench fluid inlet can be positioned at various points downstream of the fluidized bed (i.e., between the top of the fluidized bed and the top of the reactor) to tune the vapor residence time in the high-temperature reaction section. In a preferred embodiment, the decrease in temperature upon introduction of the quench fluid is between about 10° C. and 250° C. Although one inlet is shown for the quench fluid 16 in the sole FIGURE, a plurality of inlets could be provided downstream of the fluidized bed 12 to provide progressive staged quenching.

After leaving the fluidized bed region 12 of the reactor 11, (said region is located in the lower section of the reactor 11), the product vapors are quenched by the introduction of the quench fluid 16. In a currently preferred embodiment, the quench fluid 16 is introduced by an optional manifold 23 that evenly distributes the fluid radially and circumferentially in the reactor at a specified height above the bed 12. The quench manifold 23 may include a thermally insulating outer layer to avoid condensation of liquid bio-oil on the manifold. Optionally, the quench fluid 16 can be introduced at a plurality of locations at different heights above the lower section or bed region 12, where the bed material is located, to stage the quenching process. Also optionally the quench fluid 16 can be heated or cooled before entering the reactor to provide the desired temperature differential between the quench fluid and the vapor temperature in the reactor 11. One example of this arrangement is preheating the quench fluid 16 before it enters the reactor 11 to avoid localized condensation of bio-oil around the orifices where the quench fluid 16 is introduced into the reactor 11 and before it is fully mixed. One method of implementing the preheating is by routing the quench line along the exterior of the reactor 11 under the insulation layer 24.

The reactor effluent 22, which contains condensable vapors, char particles, and non-condensable gases, exits the reactor 11 and is fed to a char separator 17 that removes the char 18 from the vapors and gases. Although the sole FIGURE shows the char separator 17 as a separate process unit, it can also be integrated in to the downstream portion of the reactor 11 as is known in the prior art. The char separator 17 is preferably a cyclone separator, but could also be an impactor, mesh filter, combinations thereof, or the like. Unlike a conventional circulating fluidized bed reactor, the char separator 17 in the present invention does not separate or disengage the bed medium, (e.g., sand or catalyst) from the effluent because the bed medium does not exit the reactor 11 in the bubbling fluidized bed reactor. The char separator 17 is positioned close to the exit of the reactor 11 to quickly separate the char 18 from the product vapors because char is known to catalyze secondary cracking reactions. These heterogeneous catalytic reactions can continue at an appreciable rate at lower temperatures than homogeneous gas phase secondary cracking, and therefore removal of the char is important to reduce secondary cracking. Because the rates of these heterogeneous cracking reactions are also temperature dependent, introducing the quench fluid 16 in the reactor 11 also serves to minimize the product losses due to these reactions. The vapors and gases exit the char separator 17 (e.g., cyclone separator) and are fed to a series of process units 19 that cool, condense, and collect the bio-oil product 20. Suitable process units 19 providing the function of bio-oil cooling, condensing, and collection include conventional condensers, heat exchangers, spray towers, mesh filters, fiber beds, electrostatic precipitators, combinations thereof, and the like that are well known to persons skilled in this art. The non-condensable process gas 21 is a byproduct that can be used for a number of purposes including providing process heat via combustion of the gas, providing substantially oxygen-free fluidizing gas 14 for the process, and/or providing the quench fluid 16 as previously discussed.

While we have shown and described a currently preferred embodiment for carrying out the present invention it should be understood that the same is susceptible to changes and modifications that still embody the present invention. Therefore, we do not intend to be limited to the shown and described details but only to that outside the scope of the appended claims.

We claim:
1. A method for producing bio-oil, comprising:
   milling biomass feedstock to a particle size in the range of 1-3 mm;
   introducing a substantially oxygen-free fluidizing gas into a bubbling fluidized bed reactor from below the reactor that is kept at a temperature about 300° C. to 650° C. upstream of a fluidized bed medium in the reactor, wherein the fluidizing gas is introduced at a linear velocity above the minimum fluidization velocity for the bed;
   introducing the biomass feedstock into the reactor into the fluidized bed medium, wherein the biomass is introduced from above the fluidized bed medium and is incorporated into the fluidized bed medium through the bubbling action of the bed;
   heating the biomass feedstock inside the reactor whereby condensable organic vapors, non-condensable process gas, and char particles are produced and only the condensable organic vapors and char are elutriated along with the fluidizing gas and non-condensable process gas as a reactor effluent from the bed medium and substantially all of the fluidized bed medium remains in the reactor; and
   introducing a stream of temperature-lowering quench fluid, comprised of recycled non-condensable process gas into the reactor, only downstream of the fluidized bed medium, and wherein the introduction of the quench fluid stream only cools the elutriated condensable organic vapors, non-condensable gas, and char by about 10° C. to 250° C. upon the introduction of the quench fluid;
   wherein the temperature of the reactor effluent after quenching by the quenching fluid is maintained between about 350° C. to 450° C.;

separating the char from the condensable organic vapors shortly after quenching; and cooling the condensable organic vapors to collect the bio-oil.

2. The method of claim 1, wherein the char particles are separated from the reactor effluent downstream and externally of the reactor.

3. The method of claim 1, wherein the quench fluid is introduced at least one position downstream of the fluidized bed medium to provide progressive staged quenching.

* * * * *